US012234867B2

(12) United States Patent
Shu et al.

(10) Patent No.: US 12,234,867 B2
(45) Date of Patent: Feb. 25, 2025

(54) CONSTRAINED FLEXURE MECHANISM AND METHOD FOR MANUFACTURING THE SAME

(71) Applicant: UCHICAGO ARGONNE, LLC, Chicago, IL (US)

(72) Inventors: Deming Shu, Darien, IL (US); Steven P. Kearney, Schaumburg, IL (US); Jayson W. Anton, Chicago, IL (US); Ross J. Harder, Downers Grove, IL (US); Xianbo Shi, Naperville, IL (US); Tim M. Mooney, Westmont, IL (US); Lahsen Assoufid, Chicago, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 343 days.

(21) Appl. No.: 17/673,737

(22) Filed: Feb. 16, 2022

(65) Prior Publication Data
US 2023/0258234 A1    Aug. 17, 2023

(51) Int. Cl.
*F16D 3/79*    (2006.01)
(52) U.S. Cl.
CPC .................................... *F16D 3/79* (2013.01)
(58) Field of Classification Search
None
See application file for complete search history.

(56) References Cited

U.S. PATENT DOCUMENTS 6,607,840 B2 * 8/2003 Shu ........................... B32B 3/10
428/638
6,984,335 B2   1/2006 Shu et al.

OTHER PUBLICATIONS

Shu et al., "Design of a Capacitive-Sensor-Array-Based Real-Time Mirror Profiler for Elliptically Dynamic Bent Mirror for Hard X-Ray Zoom Optics," Published in the proceedings of the 34th Annual Meeting of the American Society for Precision Engineering, Oct. 28-Nov. 1, 2019, Pittsburgh, Pennsylvania, USA.
Shu et al., "Mechanical design of a flexural nanopositioning stage system for hard x-ray nanofocusing at the Advanced Photon Source 32-ID-C station," Published in the proceedings of the 2019 SPIE Optics + Photonics Meeting, San Diego, CA US, Aug. 11-15, 2019.

* cited by examiner

*Primary Examiner* — Daniel J. Schleis
(74) *Attorney, Agent, or Firm* — MARSHALL, GERSTEIN & BORUN LLP (57) ABSTRACT

The present disclosure relates to a flexure mechanism that includes a plurality of thin material structures, each thin material structure including a weak-link portion and a separable constraint portion. The separable constraint portion is linked to the weak-link portion and configured to stabilize the weak-link portion. Additionally, the plurality of thin material structures are stacked and secured together to form a laminar structure.

14 Claims, 9 Drawing Sheets

CONSTRAINED FLEXURE MECHANISM AND METHOD FOR MANUFACTURING THE SAME

STATEMENT REGARDING FEDERALLY SPONSORED RESEARCH OR DEVELOPMENT

The United States ("U.S.") Government has rights in this invention pursuant to Contract No. DE-AC02-06CH11357 between the U.S. Department of Energy and UChicago Argonne, LLC, representing Argonne National Laboratory.

FIELD

The present disclosure generally relates to flexure mechanisms and, more particularly, to constrained flexure mechanisms and methods for manufacturing the same.

BACKGROUND

Flexure mechanisms, which are sometimes referred to as weak-link mechanisms, allow for minute controllable movements in given directions while exhibiting stiffness to resist distortion in other directions. The flexure mechanisms are therefore useful in machines requiring both sensitive control and stability. For example, flexure mechanisms can be included in finely tuned optical devices.

The sensitivity of the flexure mechanism is based on a plurality of connecting links, each connecting link having at least one pair of weak-link connections. The weak-link connections are substantially thinner than the connecting links, allowing for precise movement control when the weak-link connections are bent.

SUMMARY

In a first aspect, a flexure mechanism is provided that includes a plurality of thin material structures, each thin material structure including a weak-link portion and a separable constraint portion. The separable constraint portion is linked to the weak-link portion and configured to stabilize the weak-link portion. Additionally, the plurality of thin material structures are stacked and secured together to form a laminar structure.

In a second aspect, a thin material structure of a flexure mechanism is provided that includes a weak-link portion formed of a thin material and a separable constraint portion formed of the thin material. Additionally, the thin material structure includes first and second linkages connecting the separable constraint portion to the weak-link portion such that the separable constraint portion is configured to stabilize the weak-link portion.

In a third aspect, a method for manufacturing a flexure mechanism by lithographic techniques is provided. The method includes repeatedly chemically etching a designed pattern with a mask to produce a plurality of individual substantially identical thin material structures. Each thin material structure includes a weak-link portion and a constraint portion secured to the weak-link portion with first and second linkages. The method further includes stacking and securing the thin material structures together to form a laminar structure, and each separable constraint portion stabilizes the respective weak-link portion during the stacking. Additionally, the method includes mechanically separating each constraint portion from the respective weak-link portion.

BRIEF DESCRIPTION OF THE DRAWINGS

The features of this disclosure which are believed to be novel are set forth with particularity in the appended claims. The present disclosure may be best understood by reference to the following description taken in conjunction with the accompanying drawings, in which like reference numerals identify like elements in the several figures, in which:

The figures depict preferred embodiments for purposes of illustration only and are not to scale. One skilled in the art will readily recognize from the following discussion that alternative embodiments of the systems and methods illustrated herein may be employed without departing from the principles of the invention described herein.

DETAILED DESCRIPTION

Flexure mechanisms are utilized for precise control. The flexure mechanism, for example, can be used for nano-focusing optics and zooming optics for radiation instrumentation and inspection instruments. These nano-focusing and nano-positioning instruments require precise resolution and stability in the nanometer scale.

Typical flexure mechanisms are laminar structures made of a stack of substantially identical sheets. Each sheet includes a number of connecting links having weak-link connections. The connecting links and the weak-link connections of each sheet are secured together via an adhesive coating. As a result, the flexure mechanism can provide controllable movements in a first direction due to the weak-link connections. However, the laminar structure is also rigid in the directions perpendicular to the first direction. As a result, typical flexure mechanisms provide controllable movements in one direction and stability in other directions.

The precision and range of travel of the typical flexure mechanism is based on the dimensions of the weak-link connections. In a typical flexure mechanism, the weak link connection may be as thin as 250 micrometer (μm or microns). Making the weak-link connections thinner generally improves the precision the flexure mechanism and also increases the range of travel the flexure mechanism can move. However, the lithographic process often used to manufacture typical flexure mechanisms cannot manufacture thinner weak-link connections because the weak-link connections are too thin and weak for the manufacturing process.

The present disclosure aims to address the problems associated with typical flexure mechanisms by providing a flexure mechanism with improved weak-link connections. The flexure mechanism is manufactured to include a constraint structure that provides sufficient stability to manufacture thinner weak-link connections. As a result, flexure mechanisms with greater ranges of travel can be manufactured without compromising the stability of those thinner weak-link connections.

Figure 1:
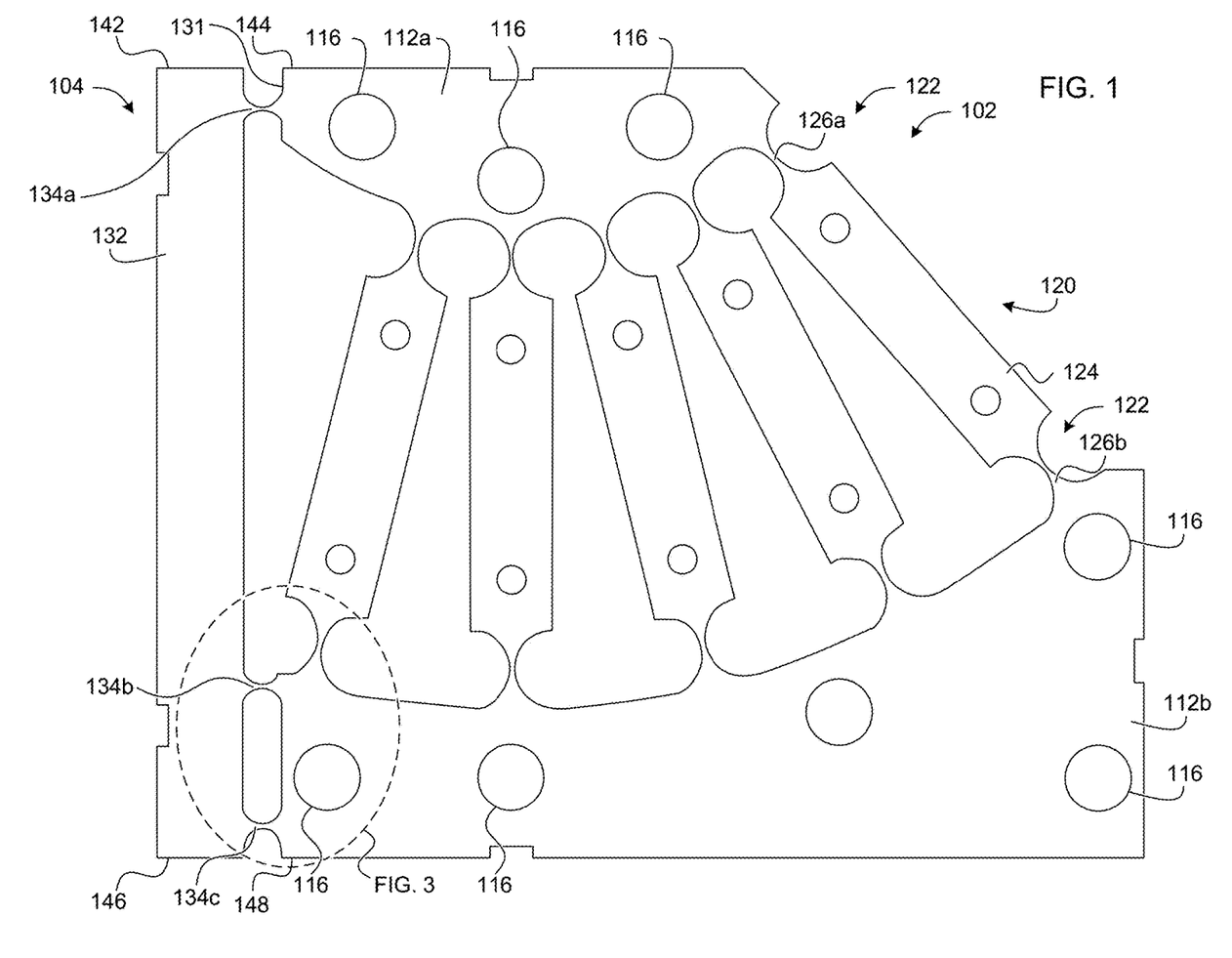
FIG. 1 is a plan view of a first example of a constrained flexure mechanism constructed in accordance with the teachings of the present disclosure.

Turning to the figures, FIG. 1 illustrates a first example of a flexure mechanism 100 constructed in accordance with the present disclosure. The flexure mechanism 100 is a laminar structure comprising a plurality of substantially identical thin material structures manufactured using a lithographic process and then stacked and secured together. Each of the thin material structures that compose the flexure mechanism 100 includes a weak-link portion 102 and a separable constraint portion 104 that provides stability to the weak-link portion 102 during the stacking and securing. Because each thin material structure is substantially identical, when the substantially identical thin material structures are stacked and secured together, the resulting laminar structure has a weak-link portion comprised of the weak-link portions 102 of each of the thin material structures, and a constraint portion comprised of the constraint portions 104 of each of the thin material structures.

The weak-link portion 102 of each thin material structure includes a carriage 112a and a base portion 112b (in some examples, the carriage 112a and/or the base portion 112b can be referred to as a leaf). In this example, the carriage and base portion 112a, 112b each have a curved shape. In other examples, however, the carriage and/or base portion 112a, 112b can have a different shape (e.g., a rectangular shape). The weak-link portion 102 of each thin material structure further includes a plurality of locating holes 116 formed in the carriage and base portion 112a, 112b. The locating holes 116 are configured to facilitate alignment of the plurality of substantially identical thin material structures in order to form the laminar structure. More particularly, when the plurality of substantially identical thin material structures are stacked together such that the locating holes 116 of the different thin material structures are aligned, the thin material structures can be secured together by disposing a plurality of fasteners in the locating holes 116.

The weak-link portion 102 of each thin material structure also includes a plurality of connecting links 120 and a plurality of weak-link connections 122. The plurality of connecting links 120 are generally connected to the carriage and base portion 112a, 112b via the weak-link connections 122. More particularly, the plurality of connecting links 120 are connected to the carriage 112a via first weak-link connections 122 whereas the plurality of connecting links 120 are connected to the base portion 112b via second weak-link connections 122. For example, a connecting link 124 of the plurality of connecting links 120 is connected to the carriage 112a via a first weak-link connection 126a and to the base portion 112b via a second weak-link connection 126b opposite the first weak-link connection 126a. Moreover, because the carriage and base portion 112a, 112b are curved, the plurality of connecting links 120 are arranged in a curved arrangement between the ends of the weak-link portion 102.

Each thin material structure of the flexure mechanism 100 additionally includes the separable constraint portion 104, which in this example is connected to one end 131 of the respective weak-link portion 102. In this example, each constraint portion 104 takes the form of a rigid constraint member 132 having a substantially rectangular shape. Each constraint portion 104 also includes a first linkage 134a, a second linkage 134b, and a third linkage 134c. In some examples, each constraint portion 104 may have more or fewer linkages than shown. However, each constraint portion 104 preferably has at least two linkages. Further, as illustrated, a first end 142 of the constraint portion 104 is aligned with a top 144 of the respective weak-link portion 102 while a second end 146 of the constraint portion 104 is aligned with a bottom 148 of the respective weak-link portion 102. Additionally, while each thin material structure of the flexure mechanism 100 only includes one separable constraint portion 104, each thin material structure can, in some examples, include a second constraint portion opposite the constraint portion 104. In turn, each thin material structure of the flexure mechanism 100 can include separable constraint portions 104 connected to opposing ends of the respective weak-link portion 102, thereby providing additional stability to that weak-link portion 102. Further yet, each thin material structure can, in some examples, include multiple constraint portions 104 connected to one or both ends of the respective weak-link portion 102 to provide even more stability to that weak-link portion 102.

As shown, each constraint portion 104 is attached to the respective weak-link portion 102 via the first linkage 134a, the second linkage 134b, and the third linkage 134c. More particularly, each rigid constraint member 132 is attached to the carriage 112a of the respective weak-link portion 102 via the first linkage 134a at a position immediately adjacent the top 144 of the respective weak-link portion 102. Additionally, each rigid constraint member 132 is attached to the base portion 112b of the respective weak-link portion 102 via the second linkage 134b and the third linkage 134c, both of which are immediately adjacent the bottom 148 of the respective weak-link portion 102. In other examples, however, each rigid constraint member 132 can be attached to the base portion 112b of the respective weak-link portion 102 via only the second linkage 134b or the third linkage 134c.

As illustrated in FIG. 1, the flexure mechanism 100 in this example includes five connecting links 120. Accordingly, the flexure mechanism 100 in this example also includes ten weak-link connections 122. In other examples, the flexure mechanism 100 may include more or fewer connecting links and, as a result, more or fewer weak-link connections (proportional to the number of connecting links). For example, the flexure mechanism 100 can include as few as two connecting links 120 (i.e., four weak-link connections) or can include over one hundred connecting links 120.

Figure 2:
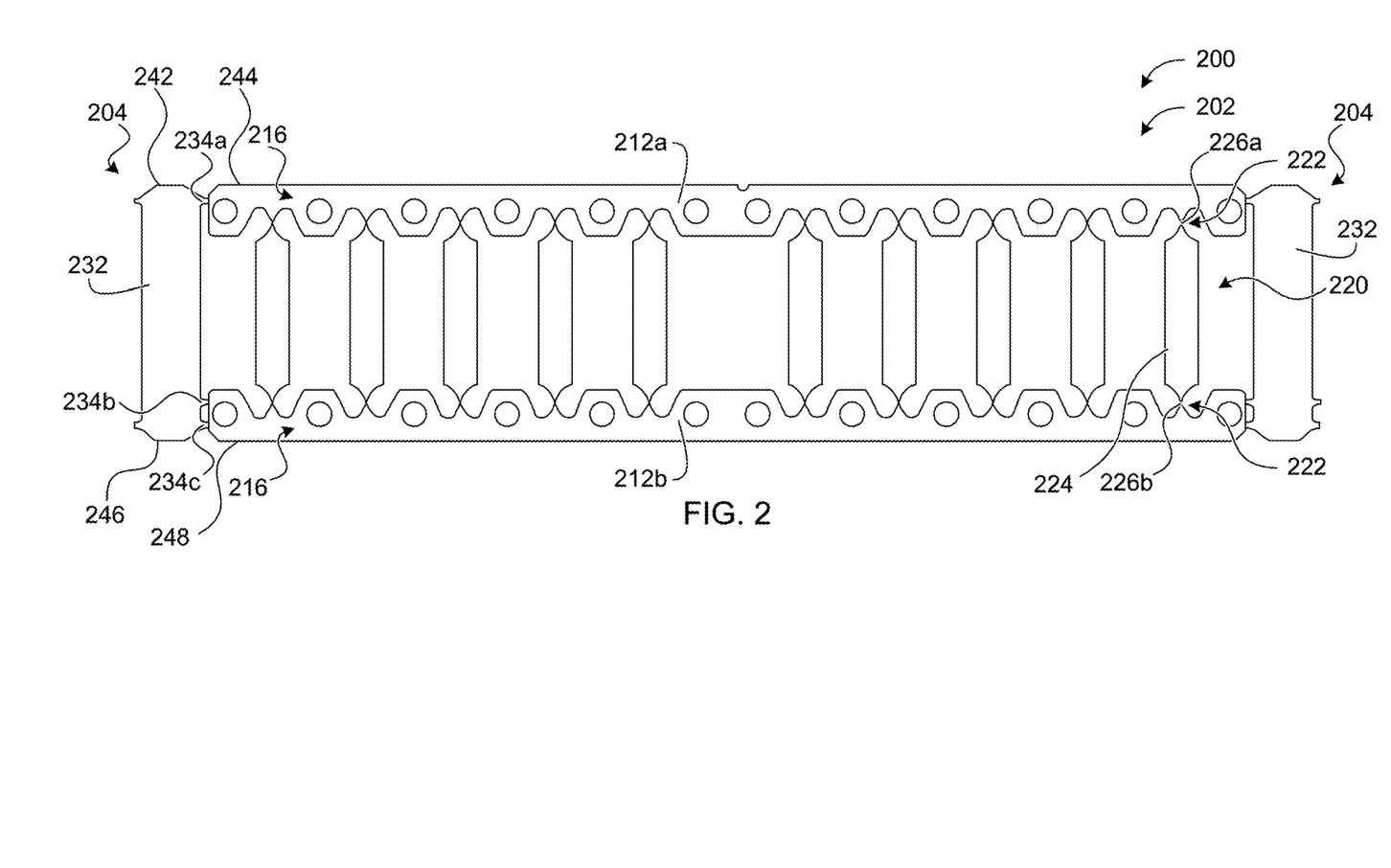
FIG. 2 is a plan view of a second example of a constrained flexure mechanism constructed in accordance with the teachings of the present disclosure.

FIG. 2 illustrates a second example of a flexure mechanism 200 constructed in accordance with the present disclosure. The flexure mechanism 200 is similar to the flexure mechanism 100, in that the flexure mechanism 200 is a laminar structure comprising a plurality of substantially identical thin material structures manufactured using a lithographic process and then stacked and secured together, with each of the thin material structures including a weak-link portion 202 and a constraint portion 204. However, the flexure mechanism 200 is different from the flexure mechanism 100 in two main ways. First, each thin material structure of the flexure mechanism 200 has a plurality of connecting links 220 oriented in a linear arrangement between the ends of the weak-link portion 202, whereas in the flexure mechanism 100, the plurality of connecting links 120 are oriented in a curved arrangement. Second, each thin material structure of the flexure mechanism 200 includes a second constraint portion 204 arranged opposite the constraint portion 204 in order to provide additional stability to the respective weak-link portion 202.

Figure 3:
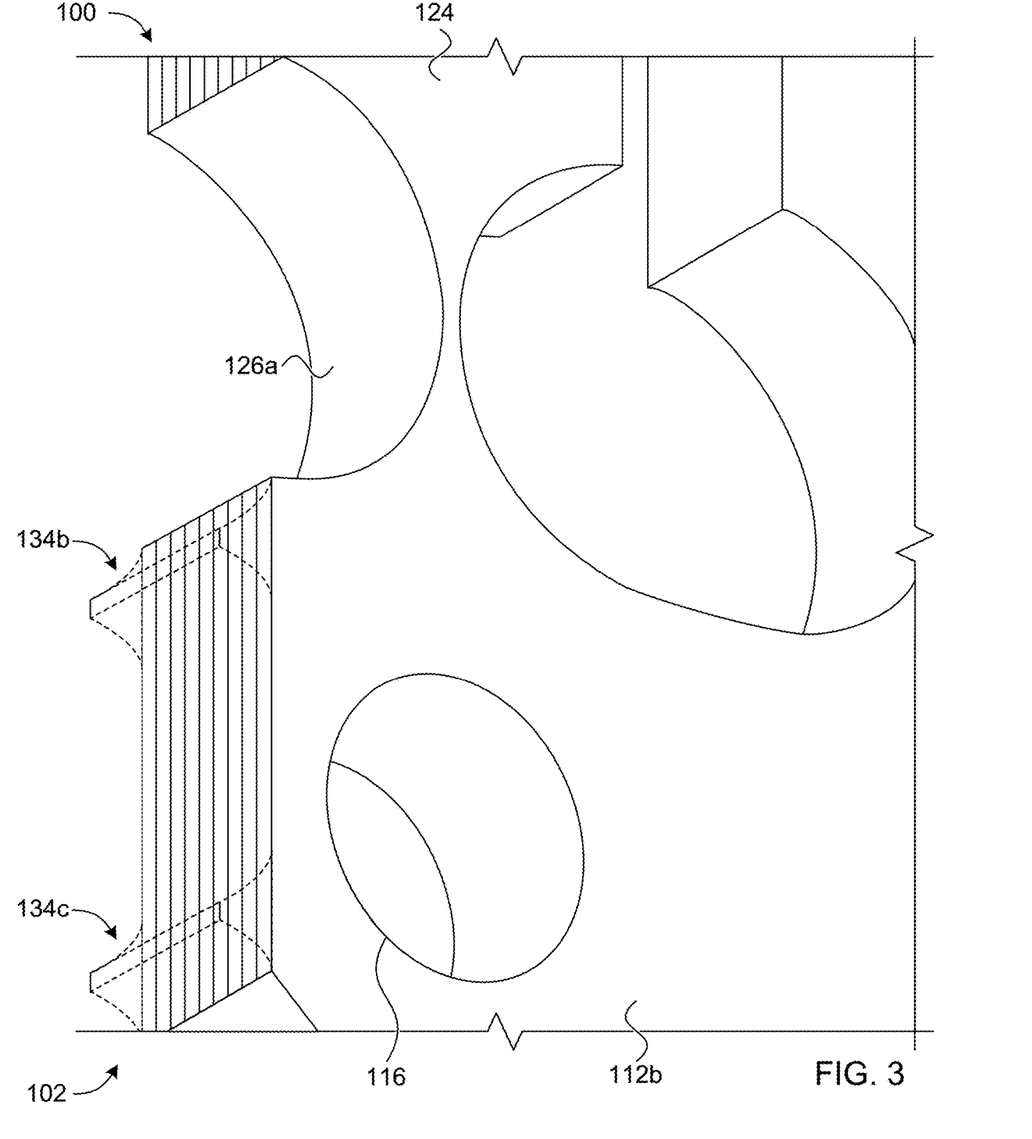
FIG. 3 is a close up, perspective view of a portion of the flexure mechanism of FIG. 1.

FIG. 3 illustrates a perspective view of a portion of the flexure mechanism 100 of FIG. 1 that shows the plurality of substantially identical thin material structures 140 that are stacked and secured together to form the flexure mechanism 100. It will be appreciated that in this example the thin material structures 140 are stacked and secured together by disposing one or more fasteners in the one or more holes 116 located in each of the weak-link portions 102 and applying an adhesive coating to sides of the stack of thin material structures 140. It will also be appreciated that the flexure mechanism 100 no longer includes any of the second linkages 134b or the third linkages 134c, as these linkages 134b, 134c have been severed in order to separate each rigid constraint 132 from the respective weak-link portion 102. In some examples, portions of the linkages 134b, 134c (shown in dashed lines) may still be connected to the weak-link portions 102 even after the rigid constraint 132 of FIG. 1 is severed.

As shown in FIG. 3, the flexure mechanism 100 in this example includes nine thin material structures 140. However, in other examples, the laminar structure created by the flexure mechanism 100 can include more or fewer thin material structures. For example, the flexure mechanism 100 can include as few as two thin material structures 140, four thin material structures 140, or more than 100 thin material structures 140.

Figure 4A:
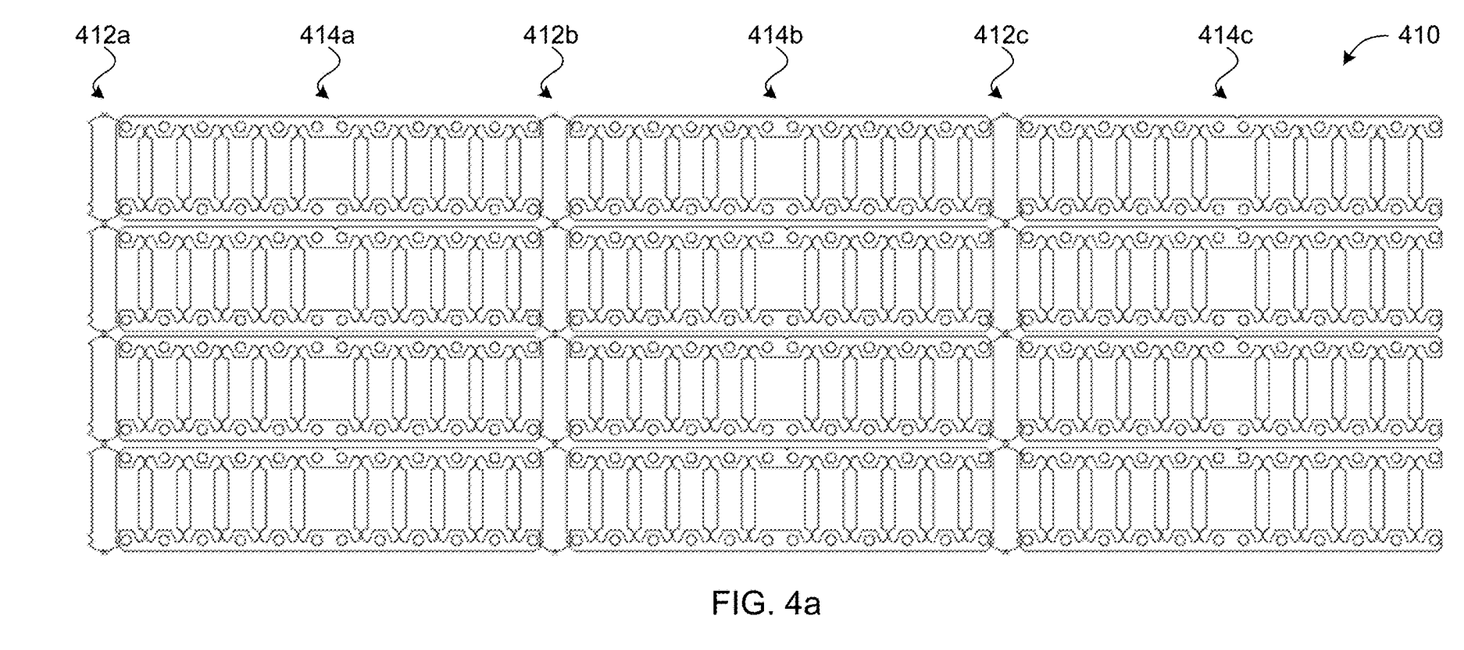
FIG. 4a is a plan view of a first example of a sheet of thin material structures constructed in accordance with the teachings of the present disclosure.

FIG. 4a illustrates an example of a sheet 410 of a plurality of thin material structures constructed in accordance with the present disclosure. In this example, the sheet 410 includes twelve thin material structures connected to one another, though in other examples, the sheet 410 can include more or less thin material structures. In any event, each thin material structure includes a weak-link portion 414a, 414b, or 414b, and the sheet 410 includes a plurality of constraint portions 412a-c (which in this example are each identical to the constraint portion 204) each connected to two or more of the weak-link portions 414a-c (which in this example are each identical to the weak-link portion 202). As shown in FIG. 4a, for example, each of the constraint portions 412b is secured on both sides to weak-link portions 414a, 414b, and each of the constraint portions 412c is secured on both sides to weak-link portions 414b, 414c. As also shown in FIG. 4a, the constraint portions 412b are also connected to one another (in the vertical direction), and the constraint portions 412c are also connected to one another (in the vertical direction).

Figure 4B:
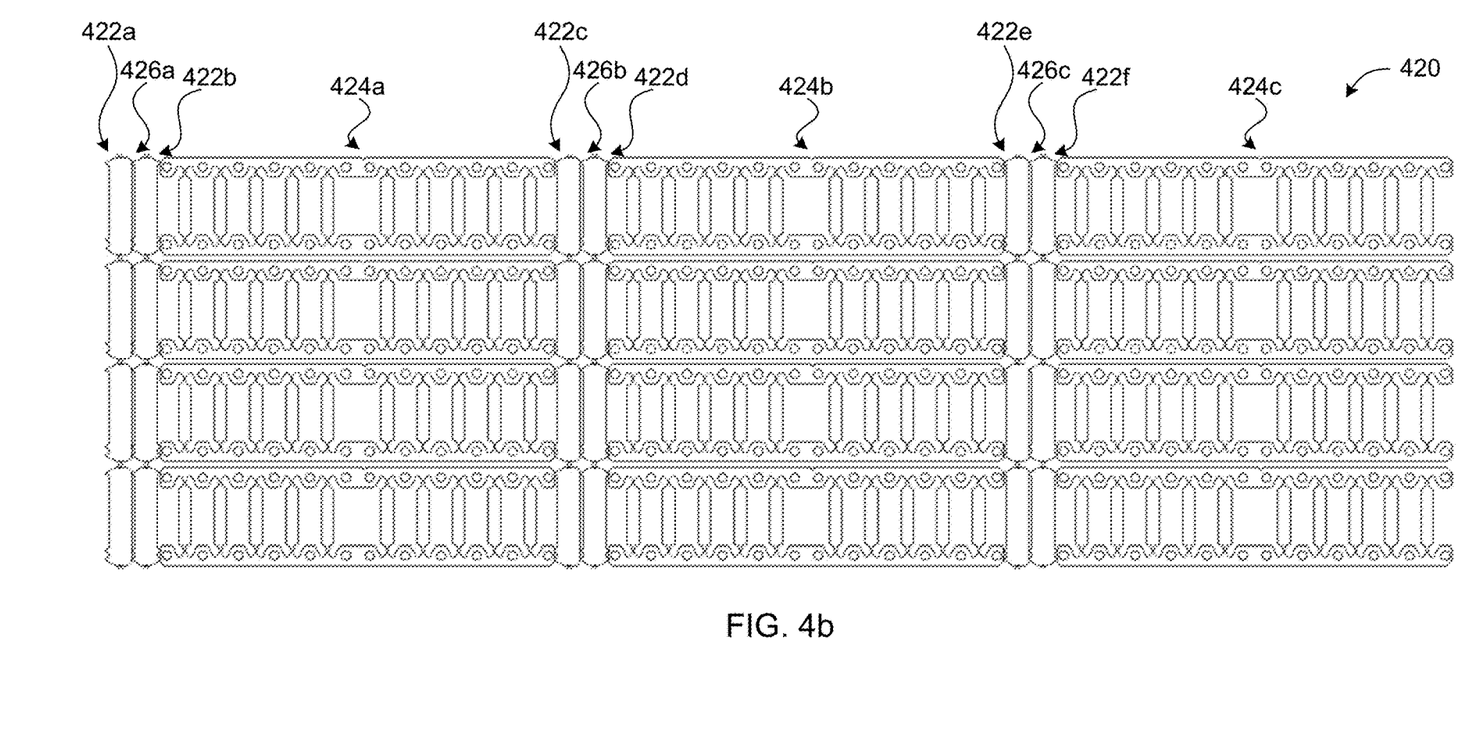
FIG. 4b is a plan view of a second example of a sheet of thin material structures constructed in accordance with the teachings of the present disclosure.

FIG. 4b illustrates another example of a sheet 420 of a plurality of thin material structures constructed in accordance with the present disclosure. The sheet 420 is similar to the sheet 410 of FIG. 4a, with the exception that the sheet 420 includes linkages 426a-c connecting adjacent constraint portions 422a-f together. Accordingly, during manufacture, the linkages 426a-c can be separated such that each weak-link portion 424a-c is still coupled to two constraint portions. For example, after the linkage 426b is cut, the weak link portions 424a are still connected to two constraint portions 422b, 422c.

Figure 5A:
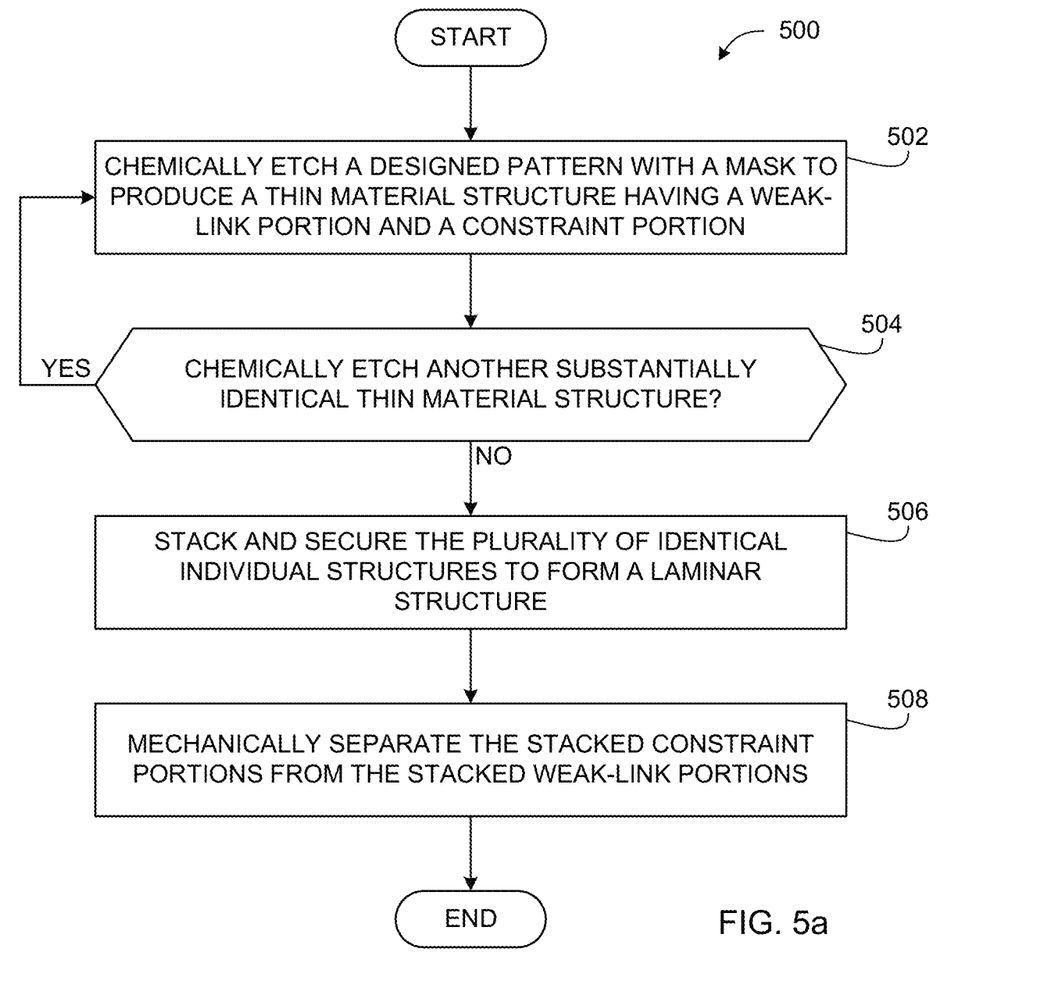
FIG. 5a is a flow diagram of an example of a method of manufacturing a flexure mechanism in accordance with the teachings of the present disclosure.

FIG. 5a illustrates a first method 500 of manufacturing a flexure mechanism (e.g., the flexure mechanism 100) constructed in accordance with the present disclosure. The method 500 utilizes a lithographic technique, though in other examples, other or additional techniques may be utilized. The flexure mechanism produced by the method 500 is generally made of metal. However, in some examples, the flexure mechanism can be formed of a nonmetallic material such as a high strength plastic or silicon material.

The first step in the method 500 includes chemically etching a designed pattern with a mask to produce one or more individual substantially identical thin material structures (e.g., the thin material structures 140) (block 502). Block 502 is repeated if it is determined that one or more additional substantially identical thin material structures need to be etched (block 504). As a result, the method 500 may include repeatedly chemically etching a designed pattern with a mask to produce a plurality of thin material structures. Each thin material structure includes a weak-link portion (e.g., the weak-link portion 102) and a constraint portion (e.g., the constraint portion 104) secured to the weak-link portion with at least first and second linkages (e.g., first and second linkages 134a, 134b). When a sufficient number of thin material structures has been chemically etched, the method 500 proceeds to block 506. The number of individual substantially identical thin material structures is selected to provide a predefined stiffness for the laminar structure.

While the sheets 410, 420 of FIGS. 4a and 4b comprise thin material structures substantially identical to those that form the flexure mechanism 200 of FIG. 2, in other examples, the sheet can comprise a plurality of thin material structures substantially identical to those that form the flexure mechanism 100 of FIG. 1. Additionally, while the sheets 410, 420 are shown as having twelve thin material structures, the sheets 410, 420 can instead have more or fewer thin material structures. For example, the sheet 410 or 420 can comprise as few as two thin material structures or several dozen thin material structures.

The method 500 further includes stacking and securing the thin material structures together to form the laminar structure (block 506). Stacking and securing the thin material structures together comprises disposing one or more fasteners in one or more holes (e.g., the holes 116) located in each of the weak-link portions. The fasteners disposed in the one or more holes facilitate the proper alignment of the substantially identical thin material structures. After the plurality of thin material structures are aligned, the method includes applying an adhesive coating to sides of the laminar structure. For example, the adhesive may include a glue, an epoxy, or other adhesive that preserves the integrity and functionality of the flexure mechanism.

After the laminar structure is formed by stacking and securing the thin material structures together, the method 500 includes mechanically separating the constraint portions from the weak-link portions (block 508). In some examples, mechanically separating the constraint portion comprises cutting the first and second linkages using a cutting or milling machine.

Figure 5B:
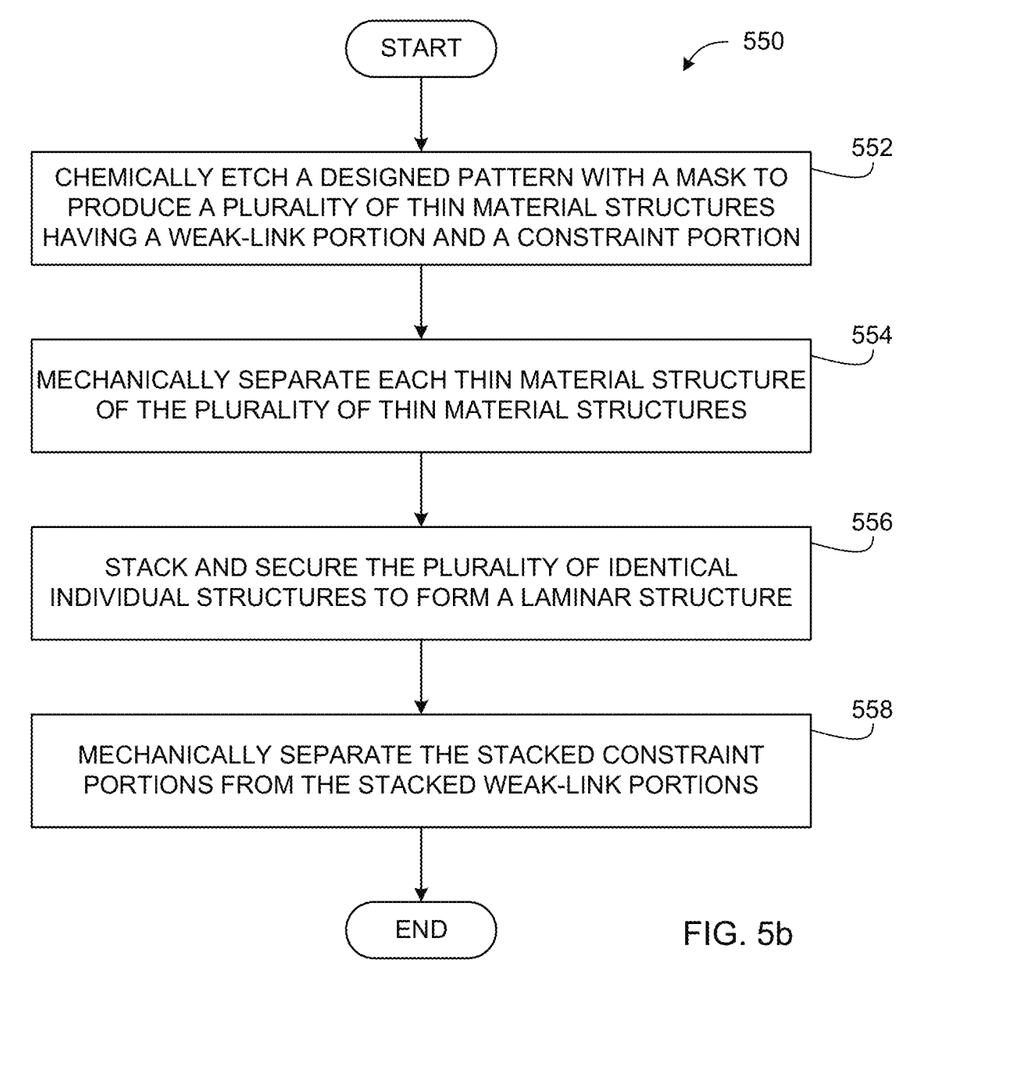
FIG. 5b is a flow diagram of another example of a method of manufacturing a flexure mechanism in accordance with the teachings of the present disclosure.

FIG. 5b illustrates another method 550 of manufacturing a flexure mechanism (e.g., the flexure mechanism 100) constructed in accordance with the present disclosure. The method 550 utilizes a lithographic technique to manufacture a sheet of thin material structures. The flexure mechanism produced by the method 500 is generally made of metal. However, in some examples, the flexure mechanism can be formed of a nonmetallic material such as a high strength plastic or silicon material.

The first step in the method 550 includes chemically etching a designed pattern with a mask to produce a plurality of identical thin material structures (e.g., the thin material structures 140) (block 552). The plurality of thin material structures produced at block 552 form a sheet of thin material structures (e.g., the sheet 410 of FIG. 4*a* or the sheet 420 of FIG. 4*b*). As a result, the method 550 may include separating each thin material structure from the other thin material structures that are part of the sheet (block 554). Each thin material structure includes at least a weak-link portion (e.g., the weak-link portion 102) and at least a constraint portion (e.g., the constraint portion 104) secured to the weak-link portion with at least first and second linkages (e.g., first and second linkages 134*a*, 134*b*). When a sufficient number of thin material structures has been separated from the plurality of thin material structures, the method 550 proceeds to block 506.

The method 550 further includes stacking and securing the thin material structures together to form the laminar structure (block 506). Stacking and securing the thin material structures together comprises disposing one or more fasteners in one or more holes (e.g., the holes 116) located in each of the weak-link portions. The fasteners disposed in the one or more holes facilitate the proper alignment of the substantially identical thin material structures. After the plurality of thin material structures are aligned, the method includes applying an adhesive coating to sides of the laminar structure. For example, the adhesive may include a glue or epoxy.

After the laminar structure is formed by stacking and securing the thin material structures together, the method 550 includes mechanically separating the constraint portions from the weak-link portions (block 558). In some examples, mechanically separating the constraint portion comprises cutting the first and second linkages using a cutting or milling machine.

It will be appreciated that the dimensions of the flexure mechanisms described herein can vary without expanding beyond the scope of this disclosure. It will also be appreciated that by utilizing the constraint portions described herein, the weak-link connections can be manufactured as thin as approximately 100 micrometers (μm) to approximately 150 μm, which is smaller than permitted in the manufacturing of typical flexure mechanisms. Of course, it will be appreciated that the thickness of each thin material structure of the flexure mechanism may be thinner (e.g., less than 100 μm, approximately 10 μm) or thicker (e.g., approximately 250 μm, approximately 500 μm). In preferred embodiments, the thin material structures have a thickness of between 100 μm and 300 μm.

By utilizing thinner weak-link connections (e.g., as thin as 100 μm) the travel range of the flexure mechanism can be increased, e.g., between 50% to 100% more than typical flexure mechanisms. The distance the flexure mechanism can move varies based on the dimensions of the flexure mechanism. For example, the travel range of the flexure mechanism having 100 μm weak-link connections constructed in accordance with the present disclosure can be as high as 1.5 millimeters.

As briefly discussed above, the flexure mechanism described herein can be used for any number of different applications, including those described in Shu et al., "Design of a capacitive-sensor-array-based real-time mirror profiler for elliptically dynamic bent mirror for hard X-ray zoom optics," published in the proceedings of the 34th Annual Meeting of the American Society for Precision Engineering, and Shu et al., "Mechanical design of a flexural nanopositioning stage system for hard x-ray nanofocusing at the Advanced Photon Source 32-ID-C station," published in the proceedings of the 2019 SPIE Optics+Photonics Meeting, the contents of which are hereby incorporated by reference in its entirety.

Figure 6:
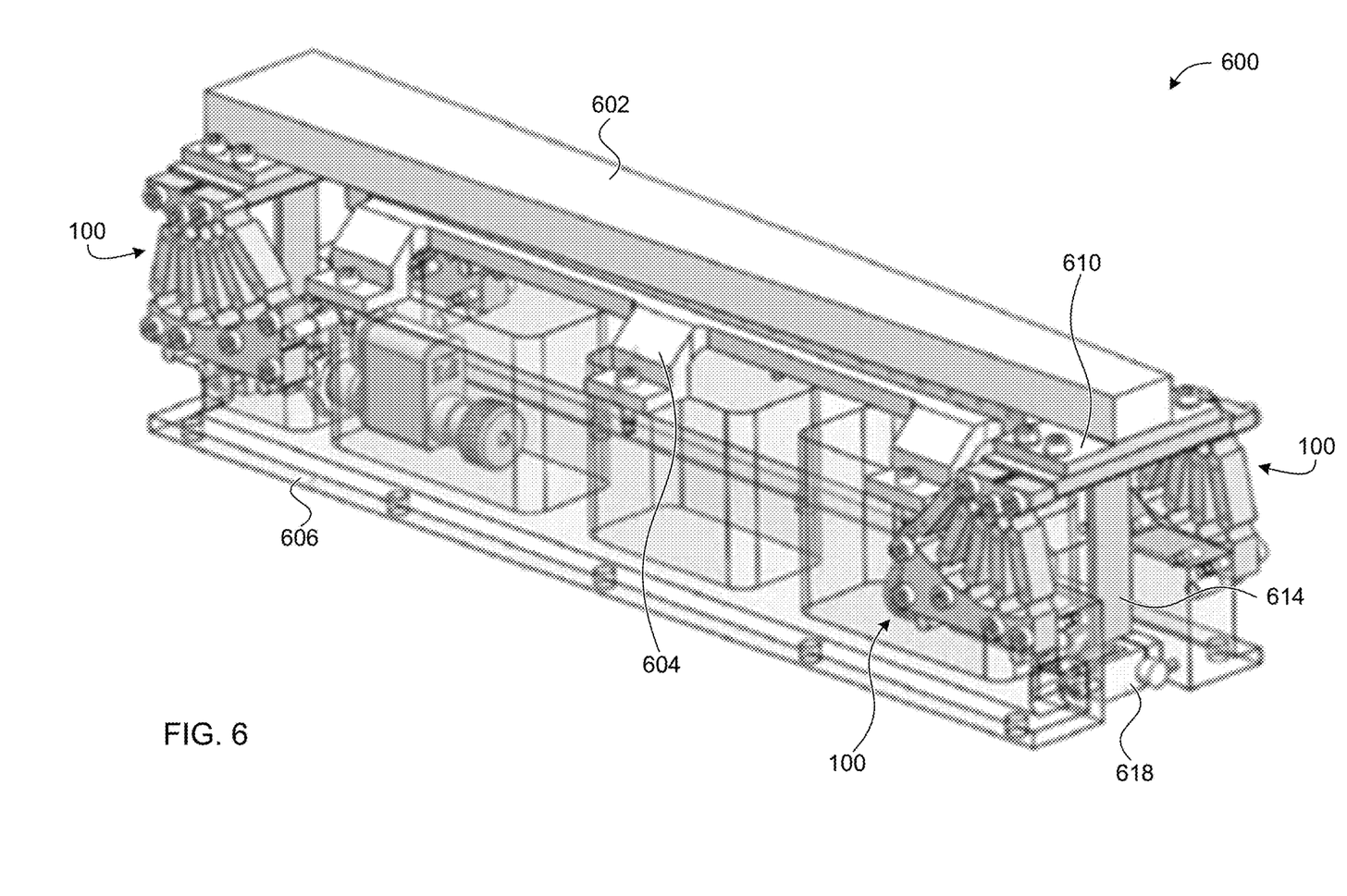
FIG. 6 is a perspective view of an elliptically bent hard X-ray mirror utilizing the flexure mechanism of FIGS. 1 and 3.

In one example, the flexure mechanisms described herein can be used for nano-focusing optics and zooming optics for radiation instrumentation and inspection instruments. FIG. 6, for example, illustrates one example of an elliptically bent hard X-ray mirror system 600 having four flexure mechanisms 100 (three shown) disposed on the X-ray mirror system 600. It will be appreciated that the constraint portions 104 of each of the four flexure mechanisms 100 have been severed from the respective weak-link portions 102 prior to being disposed on the X-ray mirror system 600.

The X-ray mirror system 600 includes mirror 602, a metrology frame 604, and a base 606. The metrology frame 604 is provided for accurate positioning and measurement. In some examples, the metrology frame 604 is made of a temperature stable metal, such as invar. The X-ray mirror system 600 includes a mirror adapter 610. The mirror adapter 610 secures the mirror 602 to a bending arm 614 connected to the flexure mechanism 100. The bending arm 614 is configured to control a bending of the mirror 602 by actuating the flexure mechanism 100. Actuation of the flexure mechanism 100 allows for precise control of the bend of the mirror 602 disposed on the metrology frame 604.

The X-ray mirror system 600 further includes a capacitive sensor 618 coupled to the bending arm 614. As a result, the X-ray mirror system 600 can measure the bending of the bending arm 614, and by extension, the bend of the mirror 602. In some examples, the metrology frame 604 may further have capacitive sensors to measure the bend of the mirror 602.

Figure 7:
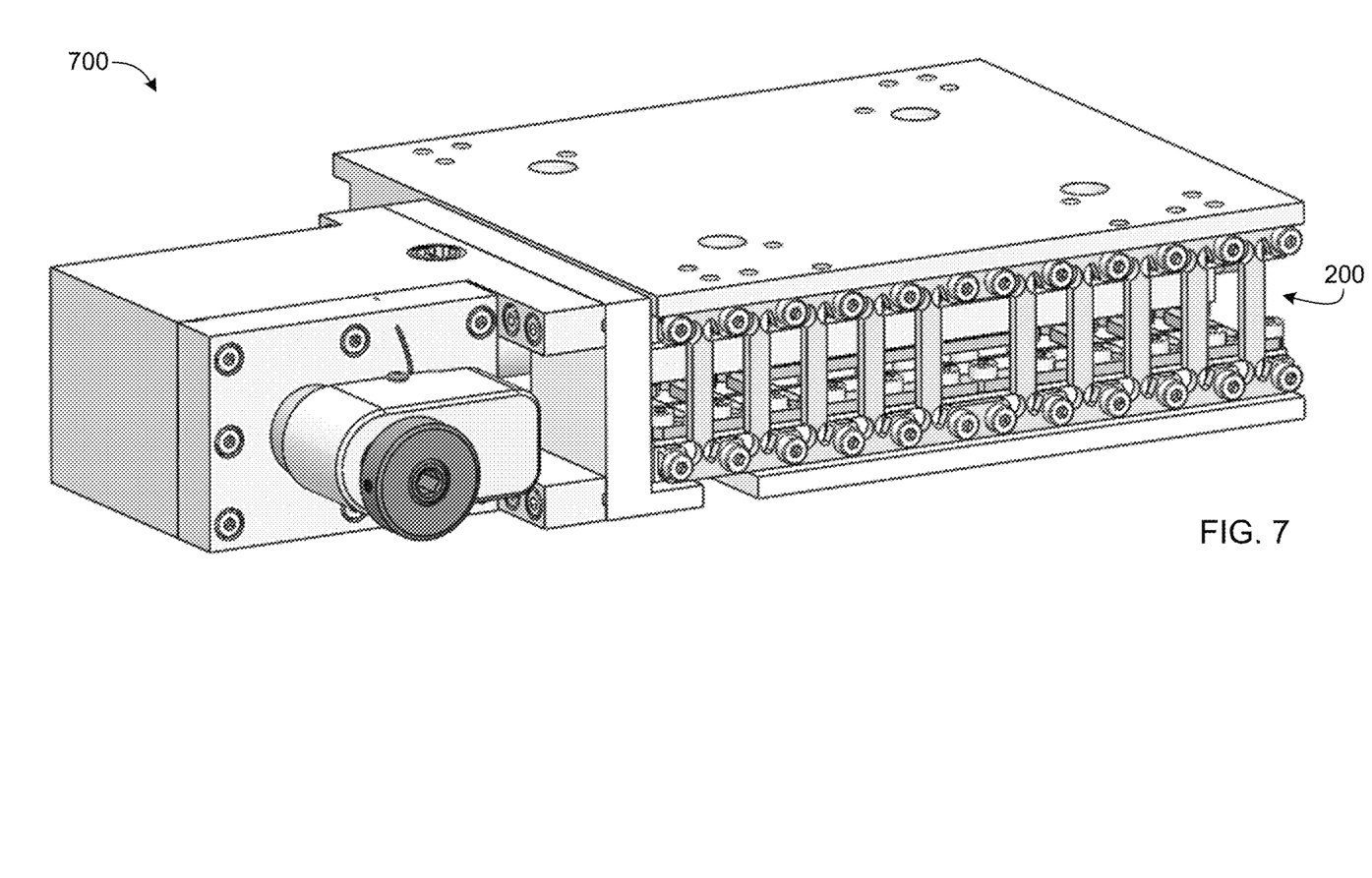
FIG. 7 is a perspective view of a nanofocusing mirror apparatus utilizing the flexure mechanism of FIG. 2.

Further, FIG. 7 illustrates another nanofocusing mirror apparatus 700 that utilizes a flexure mechanism 200 in accordance with the teachings of the present disclosure. The flexure mechanism 200 is used to precisely control a Kirkpatrick-Baez (KB) mirror used in nanofocusing X-rays. Similar to the X-ray mirror system 600, actuating the flexure mechanism 200 precisely controls the KB mirror to precisely control the direction of X-rays. It will be appreciated that the constraint portions 204 of the flexure mechanisms 200 have been severed from the respective weak-link portions 102 prior to being incorporated into the nanofocusing mirror apparatus 700.

The following list of aspects reflects a variety of the embodiments explicitly contemplated by the present application. Those of ordinary skill in the art will readily appreciate that the aspects below are neither limiting of the embodiments disclosed herein, nor exhaustive of all the embodiments conceivable from the disclosure above, but are instead meant to be exemplary in nature.

1. A flexure mechanism, comprising: a plurality of thin material structures, each thin material structure including a weak-link portion and a separable constraint portion linked to the weak-link portion and configured to stabilize the weak-link portion; wherein the plurality of thin material structures are stacked and secured together to form a laminar structure.

2. The flexure mechanism of aspect 1, wherein each thin material structure further includes one or more holes located in the weak-link portion, and wherein the plurality of thin material structures are secured together with one or more fasteners received in the one or more respective holes.

3. The flexure mechanism of aspect 1, wherein the plurality of thin material structures are secured together with an adhesive coating applied to sides of the stack.

4. The flexure mechanism of aspect 1, wherein each weak-link portion includes a carriage, a base, and a plurality of connecting links connected to the carriage and the base.

5. The flexure mechanism of aspect 4, wherein each connecting link of the plurality of connecting links is connected to the carriage via a first weak-link connection and to the base via a second weak-link connection opposite the first weak-link connection.

6. The flexure mechanism of aspect 5, wherein each separable constraint portion is attached to the respective weak-link portion via first and second linkages.

7. The flexure mechanism of aspect 1, wherein each separable constraint portion is attached to an end of the respective weak-link portion.

8. The flexure mechanism of aspect 1, wherein each separable constraint portion is a rigid member.

9. A thin material structure of a flexure mechanism, comprising: a weak-link portion formed of a thin material; a separable constraint portion formed of the thin material; and first and second linkages connecting the separable constraint portion to the weak-link portion such that the separable constraint portion is configured to stabilize the weak-link portion.

10. The weak-link thin material structure of aspect 9, wherein the weak-link portion comprises a carriage, a base and a plurality of connecting links connected to the carriage and the base, and wherein each connecting link of the plurality of connecting links is connected to the carriage via a first weak-link connection and to the base via a second weak-link connection opposite the first weak-link connection.

11. The weak-link thin material structure of aspect 9, wherein the separable constraint portion is a rigid member.

12. The weak-link thin material structure of aspect 9, further comprising an additional separable constraint portion connected to the weak-link portion via third and fourth linkages such that the additional separable constraint portion is configured to further stabilize the weak-link portion.

13. The weak-link thin material structure of aspect 12, wherein the separable constraint portion is attached to a first end of the weak-link portion via the first and second linkages and the additional separable constraint portion is attached to a second end of the weak-link portion via the third and fourth linkages, the second end being opposite the first end.

14. The weak-link thin material structure of aspect 9, further comprising at least two locating holes disposed in the weak-link portion.

15. A method for manufacturing a flexure mechanism by lithographic techniques, comprising: chemically etching a designed pattern with a mask to produce a plurality of individual substantially identical thin material structures, each thin material structure including a weak-link portion and a constraint portion secured to the weak-link portion with first and second linkages; stacking and securing the thin material structures together to form a laminar structure, wherein each separable constraint portion stabilizes the respective weak-link portion during the stacking; and mechanically separating each constraint portion from the respective weak-link portion.

16. The method of manufacturing the flexure mechanism of aspect 15, wherein mechanically separating the constraint portion from the weak-link portion comprises cutting the first and second linkages using a cutting or milling machine.

17. The method of manufacturing the flexure mechanism of aspect 15, wherein the plurality of individual substantially identical thin material structures are selected to provide a predefined stiffness for the laminar structure.

18. The method of manufacturing the flexure mechanism of aspect 15, wherein the plurality of substantially identical thin material structures includes at least one linkage disposed between at least two constraint portions, and mechanically separating the constraint portions by cutting the linkage disposed between the constraint portions.

19. The method of manufacturing the flexure mechanism of aspect 15, wherein stacking and securing the thin material structures together comprises disposing one or more fasteners in one or more holes located in each of the weak-link portions.

20. The method of manufacturing the flexure mechanism of aspect 19, wherein stacking and securing the stacked structures together further comprises applying an adhesive coating to sides of the laminar structure 21. The method of manufacturing the flexure mechanism of aspect 15, wherein the weak-link mechanism is made of metal.

The invention claimed is:

1. A flexure mechanism, comprising:
a plurality of thin material structures, each thin material structure having a thickness between approximately 10 micrometers (μm) and approximately 500 μm and including:
  a weak-link portion including:
    a carriage having a carriage top surface, a carriage bottom surface, and a carriage side surface disposed between the carriage top surface and the carriage bottom surface;
    a base having a base top surface, a base bottom surface, and a base side surface disposed between the base top surface and the base bottom surface; and
    at least one connecting link extending between the carriage bottom surface and the base top surface; and
  a separable constraint portion-linked to the weak-link portion and including at least one first linkage extending toward the carriage side surface and at least one second linkage extending toward the base side surface, the separable constraint portion configured to stabilize the weak-link portion;
wherein the plurality of thin material structures are stacked and secured together to form a laminar structure.

2. The flexure mechanism of claim 1, wherein each thin material structure further includes one or more holes located in the weak-link portion, and wherein the plurality of thin material structures are secured together with one or more fasteners received in the one or more respective holes.

3. The flexure mechanism of claim 1, wherein the plurality of thin material structures are secured together with an adhesive coating applied to sides of the stack.

4. The flexure mechanism of claim 1, wherein each weak-link portion includes a plurality of connecting links.

5. The flexure mechanism of claim 4, wherein each connecting link of the plurality of connecting links is connected to the carriage via a first weak-link connection and to the base via a second weak-link connection opposite the first weak-link connection.

6. The flexure mechanism of claim 1, wherein each separable constraint portion is attached to an end of the respective weak-link portion.

7. The flexure mechanism of claim 1, wherein each separable constraint portion is a rigid member.

8. A thin material structure of a flexure mechanism, comprising:

a weak-link portion formed of a thin material having a thickness between approximately 10 micrometers (μm) and approximately 500 μm, the weak-link portion including a carriage, a base, and at least one connecting link connected to the carriage and the base between a first end and a second end of the weak-link portion;

a separable constraint portion formed of the thin material; and first and second linkages, both the first and second linkages disposed on the first end of the weak-link portion, the first linkage extending from the separable constraint portion to the carriage of the weak-link portion and the second linkage extending from the separable constraint portion to the base of the weak-link portion such that the separable constraint portion is configured to stabilize the weak-link portion.

9. The flexure mechanism of claim 1, wherein the separable constraint portion further comprises a third linkage coupled to one of the carriage side surface and the base side surface.

10. The thin material structure of claim 8, wherein the weak-link portion comprises a plurality of connecting links, and wherein each connecting link of the plurality of connecting links is connected to the carriage via a first weak-link connection and to the base via a second weak-link connection opposite the first weak-link connection.

11. The thin material structure of claim 8, wherein the separable constraint portion is a rigid member.

12. The thin material structure of claim 8, further comprising an additional separable constraint portion connected to the weak-link portion via third and fourth linkages such that the additional separable constraint portion is configured to further stabilize the weak-link portion.

13. The thin material structure of claim 12, wherein the additional separable constraint portion is attached to the second end of the weak-link portion via the third and fourth linkages, the second end being opposite the first end.

14. The thin material structure of claim 8, further comprising at least two locating holes disposed in the weak-link portion.

* * * * *